(12) United States Patent
Tanaka (10) Patent No.: US 8,218,167 B2
(45) Date of Patent: Jul. 10, 2012

(54) IMAGE OUTPUT SYSTEM, IMAGE FORMING APPARATUS, AND IMAGE FORMING OPERATION PROGRAM FOR PREVENTING OUTPUT OF A CONFIDENTIAL DOCUMENT

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 783 days.

(21) Appl. No.: 12/388,022

(22) Filed: Feb. 18, 2009

(65) Prior Publication Data

US 2009/0207434 A1     Aug. 20, 2009

(30) Foreign Application Priority Data

Feb. 19, 2008  (JP) ................................. 2008-037110

(51) Int. Cl.
 *G06K 15/00* (2006.01)
 *G06F 21/00* (2006.01)
(52) U.S. Cl. .................. 358/1.14; 358/1.18; 358/1.13; 358/1.1; 358/3.28; 358/540; 713/176; 713/183; 713/184; 713/173; 726/3; 726/32; 726/33; 711/164; 382/100; 382/135; 382/181; 380/201; 380/210; 380/243; 380/30
(58) Field of Classification Search ............ 358/1.1, 358/1.18, 1.13, 1.14, 1.15, 453, 403, 3.28; 380/243, 201, 203, 210, 30; 713/202, 176, 713/183, 184; 711/164; 382/100, 138, 137, 382/135, 181, 190, 198
See application file for complete search history.

(56) References Cited

U.S. PATENT DOCUMENTS

| | | | | |
|---|---|---|---|---|
| 6,928,545 | B1 * | 8/2005 | Litai et al. | 713/185 |
| 7,305,560 | B2 * | 12/2007 | Giobbi | 713/182 |
| 7,701,598 | B2 * | 4/2010 | Tanaka | 358/1.14 |
| 7,929,695 | B2 * | 4/2011 | Song et al. | 380/55 |
| 7,971,020 | B2 * | 6/2011 | Pelly | 711/164 |
| 2001/0010081 | A1 * | 7/2001 | Nagahama | 713/202 |
| 2005/0058476 | A1 | 3/2005 | Murakami | |
| 2005/0078331 | A1 | 4/2005 | Guan et al. | |
| 2008/0129758 | A1 * | 6/2008 | Fox et al. | 345/661 |

FOREIGN PATENT DOCUMENTS

| | | |
|---|---|---|
| JP | 2001312388 | 11/2001 |
| JP | 2004-274092 | 9/2004 |
| JP | 2005-94327 | 4/2005 |
| JP | 2006-060805 | 3/2006 |
| JP | 2007312093 | 11/2007 |

* cited by examiner

*Primary Examiner* — Twyler Haskins
*Assistant Examiner* — Dennis Dicker
(74) *Attorney, Agent, or Firm* — Gerald E. Hespos; Michael J. Porco (57) ABSTRACT

An image output system includes a computer and a complex machine connected to the computer. A password generating section of the complex machine, in a case where a user ID transmitted from a transmitting section of the computer is stored in a HDD, generates a password which is different from the user ID, and the transmitting section transmits the password generated by the password generating section. A controller, in a case where the password received by a password receiving section and the password transmitted from the password transmitting section to the computer, controls an image forming section to output image data which is not combined with electronic watermark information by an electronic watermark information combining section.

9 Claims, 7 Drawing Sheets

IMAGE OUTPUT SYSTEM, IMAGE FORMING APPARATUS, AND IMAGE FORMING OPERATION PROGRAM FOR PREVENTING OUTPUT OF A CONFIDENTIAL DOCUMENT

BACKGROUND OF THE INVENTION

1. Field of the Invention

The present invention relates to an image output system, an image forming apparatus, and an image forming operation program. More particularly, it relates a technology to prevent unauthorized output of image data.

2. Description of the Related Art

In recent years, leakage of confidential information due to unfair outputting of a confidential document and taking out the same to outside is a big problem in companies and the like. A technology for preventing such output and taking-out of a confidential document has been strongly desired.

As technologies for preventing output and taking-out of the confidential document, there have been proposed a technology of applying a pattern processing to image data to be outputted as disclosed in Japanese Patent Unexamined Publication No. 2005-94327, a technology of embedding copy-guard information as electronic watermark information to image data to be outputted as disclosed in Japanese Patent Unexamined Publication No. 2004-274092, and a technology of embedding information, indicating output date information and information associated with a personal computer and a printer, as electronic watermark information into a background image as disclosed in Japanese Patent Unexamined Publication No. 2006-60805.

SUMMARY OF THE INVENTION

The present invention was made by further improving the conventional technologies.

In summary, an image output system according to an aspect of the present invention includes: a computer; and an image forming apparatus connected to the computer, and the computer includes: an output instruction receiving section which receives from a user an input of an image output instruction with respect to the image forming apparatus; an identification information receiving section which receives from a user an input of the user's unique identification information of the user; a transmitting section which transmits the image output instruction and the identification information respectively received by the output instruction receiving section and the identification information receiving section to the image forming apparatus; a receiving section which receives a password replied from the image forming apparatus in response to the identification information transmitted from the transmitting section to the image forming apparatus; and a display section which displays the password received by the receiving section, and the image forming apparatus includes: an electronic watermark information combining section which combines electronic watermark information with image data to be outputted; an output section which outputs image data to be outputted or image data which has been combined with the electronic watermark information by the electronic watermark information combining section; an identification information storage section which stores identification information for permission to output image data which is not combined with the electronic watermark information; an identification information receiving section which receives identification information transmitted from the transmitting section of the computer; a password generating section which generates a password different from the identification information if the identification information received by the identification information receiving section is stored in the identification information storage section; a password transmitting section which transmits the password generated by the password generating section to the computer; a password receiving section which receives input of a password from a user; and a controller which controls the output section to output image data which is not combined with the electronic watermark information by the electronic watermark information combining section in a case where the password received by the password receiving section matches with the password transmitted from the password transmitting section to the computer.

These and other objects, features and advantages of the present invention will become more apparent upon reading of the following detailed description along with the accompanied drawings.

DETAILED DESCRIPTION OF THE PREFERRED EMBODIMENTS

Figure 1:
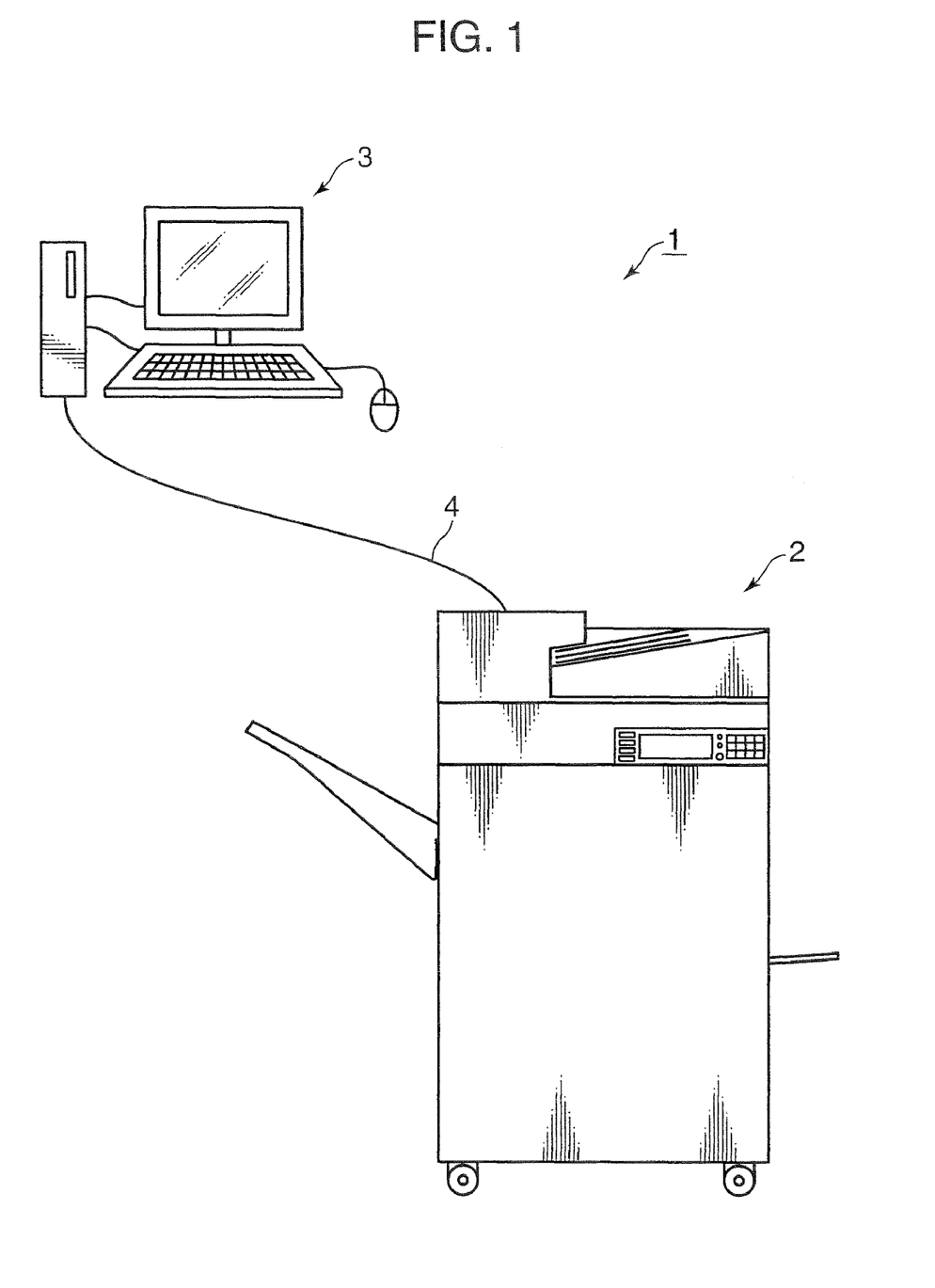
FIG. 1 schematically shows a configuration of an image output system in accordance with an embodiment of the present invention.

Hereinafter, an image output system and an image forming apparatus in accordance with an embodiment of the present invention will be described. FIG. 1 schematically shows a configuration of the image output system in accordance with the embodiment of the present invention. As shown in FIG. 1, the image output system 1 is so configured that a complex machine 2 and a computer 3 e.g. a personal computer are communicable through, for example, a communication cable 4 (for example, LAN (Local Area Network), a parallel transfer cable, a serial transfer cable, or the like). Print data (image data to be outputted) transmitted from the computer 3 is received by the complex machine 2, and the complex machine 2 performs an image forming operation in accordance with print data. In the present embodiment, it is so configured that the complex machine 2 and the computer 3 are communicable with each other through a wired connection. However, it may also be configured that the complex machine 2 and the computer 3 are communicable through a wireless connection.

Figure 2:
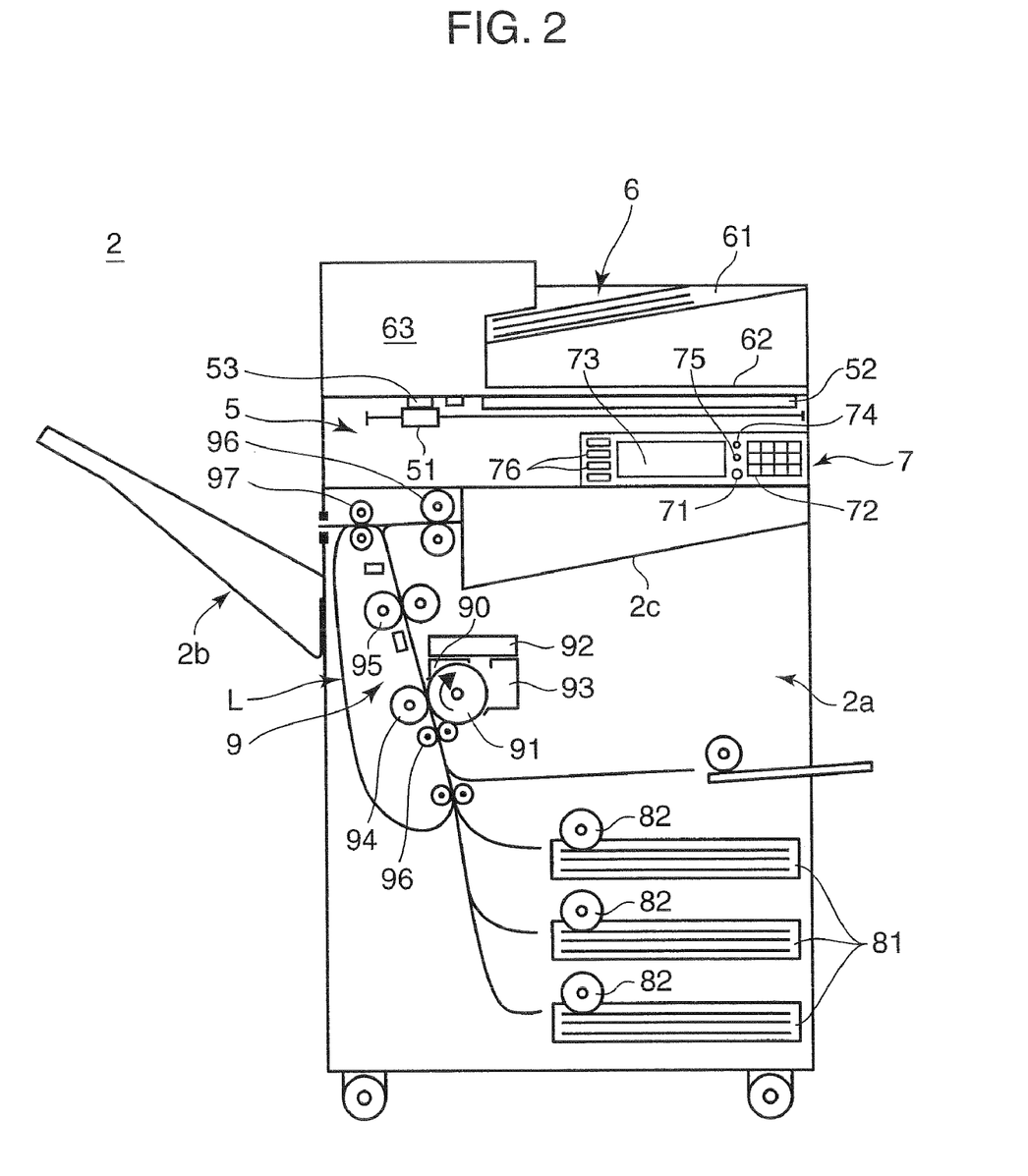
FIG. 2 is a side view schematically showing an internal configuration of a complex machine which is an image forming apparatus in accordance an embodiment of the present invention.

FIG. 2 is a side view schematically showing an internal configuration of the complex machine 2 which is an image forming apparatus in accordance with an embodiment of the present invention. As shown in FIG. 2, the complex machine 2 has functions such as a copying function, a printer function, a scanner function, and a facsimile function and includes a main body section 2a, a stack tray 2b provided on a left side of the main body section 2a, a document reading section 5 provided in an upper portion of the main body section 2a, and a document feeding section 6 provided above the document reading section 5.

Further, on a front portion of the complex machine 2, there is provided an operating section 7. The operating section 7 is provided with a start key 71 for allowing a user to input a printing executing instruction, numerical keys 72 for inputting the number of prints and the like, a display section 73 which displays operation guide information and the like for various copying operation and includes a liquid crystal display having a touch panel function for inputs of various settings, a reset key 74 for resetting a content of setting which is set through the display section 73, a stop key 75 (an example of the operating section) for allowing a user to input a cancelling instruction of cancelling a printing (image forming operation) under execution, and a function switching key 76 for switching a copying function, a printer function, a scanner function, and a facsimile function.

The document reading section 5 includes a scanner portion 51 which is configured by a CCD (Charge Coupled Device) sensor, an exposure lamp, and the like, and a document holder 52 and a document reading slit 53 which are configured by a transparent member such as glass. The scanner portion 51 is so configured as to be movable by an unillustrated driving section. At the time of reading a document placed on the document holder 52, the scanner portion 51 moves along a document surface at a position of facing the document holder 52 and outputs print data which is obtained by scanning a document image to a control unit 21 which will be described later. Further, at the time of reading a document which is fed by the document feeding section 6, the scanner portion 51 is moved to a position of facing the document reading slit 53, obtains image data of the document through the document reading slit 53 in synchronization with a document conveying operation performed by the document feeding section 6, and then outputs image data thereof to the control unit 21.

The document feeding section 6 includes a document holding portion 61 for holding a document, a document discharging portion 62 for discharging a document whose image has been read, and a document conveying mechanism 63 which is configured by a sheet-feeding roller (unillustrated), a conveying roller (unillustrated), and the like for taking out a document placed on the document holding portion 61 one after another, conveying the document to the position of facing the document reading slit 53, and discharging the document to the document discharging portion 62.

Further, the document feeding section 6 is provided rotatably with respect to the main body section 2a such that a front surface side of the document feeding section 6 is movable in an upward direction. By moving the front surface side of the document feeding section 6 upward to open the upper surface of the document holder 52, an user can place a document to be read, such as an opened book, onto an upper surface of the document holder 52.

The main body section 2a includes a plurality of sheet-feeding cassettes 81, sheet-feeding rollers 82 for taking out sheets one after another from the sheet-feeding cassettes 81 and conveying the sheets to an image forming section 9, and the image forming section 9 which forms images onto sheets which are conveyed from the sheet-feeding cassettes 81.

The image forming section 9 includes a charging device 90 which charges a surface of a photoconductive drum 91, an optical unit 92 which outputs a laser or the like in accordance with print data obtained by the scanner portion 51 or the like for exposure of the charged photoconductive drum 91 to form an electrostatic latent image on the photoconductive drum 91, a developing section 93 which forms a toner image by allowing toner to adhere to the surface of the photoconductive drum 91 on which the electrostatic latent image is formed, a transferring section 94 which transfers a toner image on the photoconductive drum 91 to a sheet, a fixing section 95 which fixes the toner image to the sheet by heating the sheet onto which the toner image is transferred, and conveying rollers 96 and 97 which are provided in a sheet conveying passage in the image forming section 9 and convey the sheet to the stack tray 2b or the sheet-discharging tray 2c.

In a case of forming images on opposite sides of a sheet, an image is formed on one side of the sheet by the image forming section 9, and thereafter the sheet is nipped by the conveying rollers 96 on the side of the sheet-discharging tray 2c. The conveying rollers 96 are reversely rotated in this state to switch back the sheet, so that the sheet is sent to a sheet conveying passage L and conveyed again to an upstream region of the image forming section 9. After that, the sheet is discharged to the stack tray 2b or the sheet-discharging tray 2c.

Figure 3:
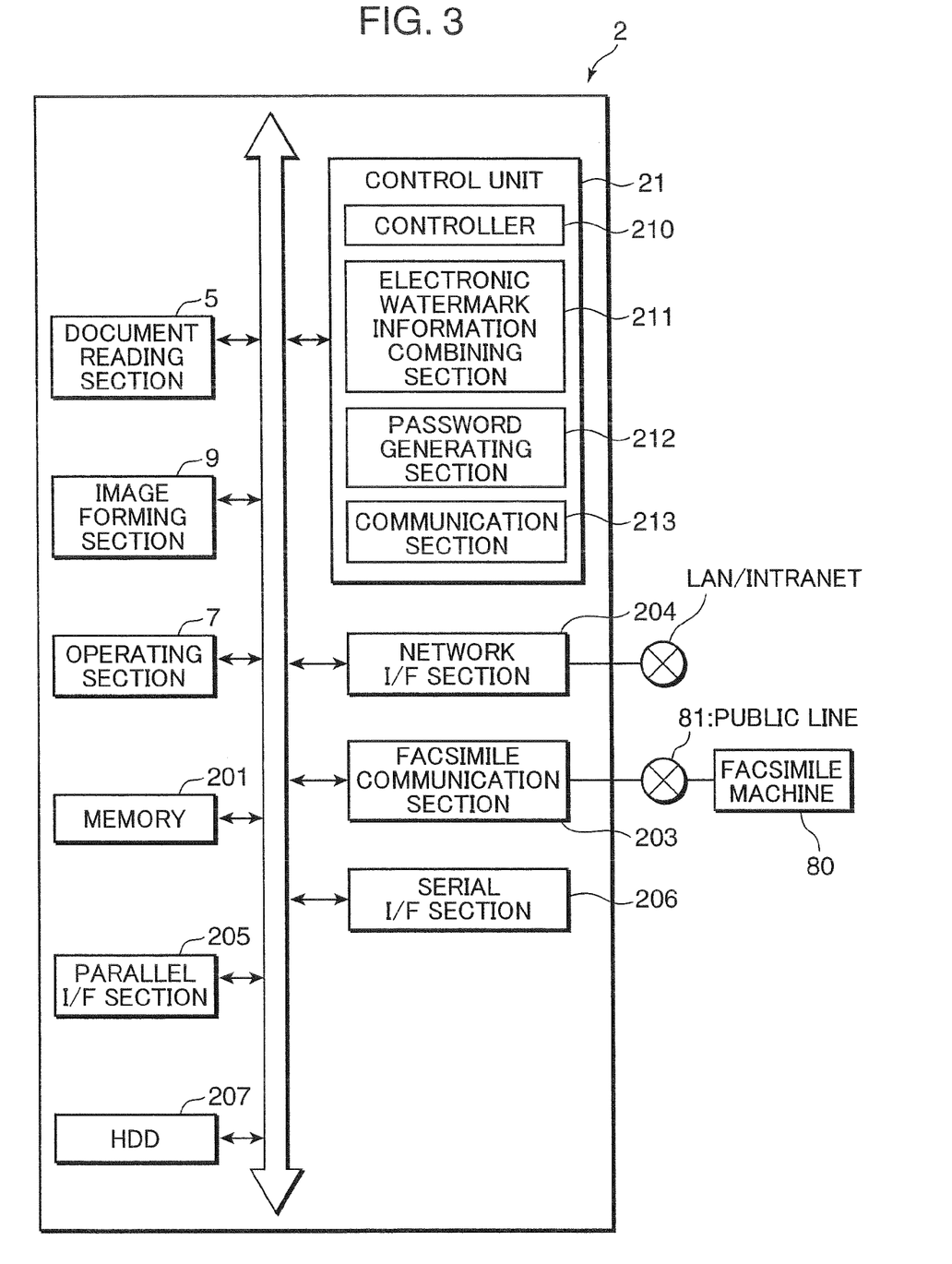
FIG. 3 is a block diagram showing an electrical configuration of the complex machine.
Figure 4:
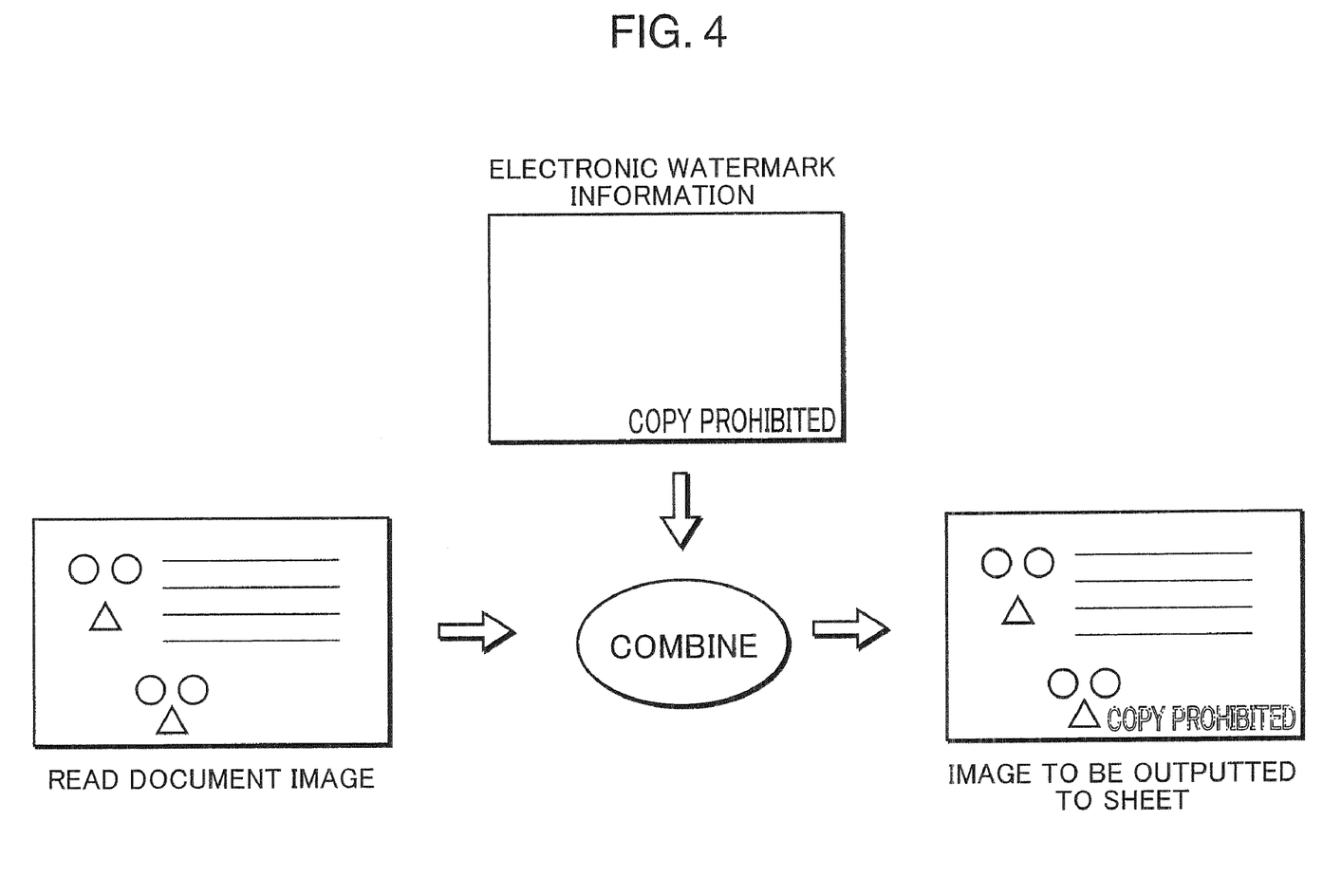
FIG. 4 schematically shows a condition of combining an electronic watermark information to an image to be printed onto a sheet.

FIG. 3 is a block diagram showing an electric configuration of the complex machine 2, and FIG. 4 schematically shows a condition of combining an electronic watermark information to an image to be printed onto a sheet. The complex machine 2 includes the document reading section 5, the image forming section 9, a memory 201, the control unit 21, the operating section 7, a facsimile communication section 203, a network I/F section 204, a parallel I/F section 205, a serial I/F section 206, and a HDD (Hard Disk Drive) 207.

The document reading section 5 corresponds to the document reading section 5 shown in FIG. 1 and is adapted to generate print data by obtaining an document image through a photoelectric conversion processing.

The image forming section 9 corresponds to the image forming section 9 shown in FIG. 1 and is adapted to print an image corresponding to print data onto a predetermined sheet. The print data includes print data of a document read by the document reading section 5, print data received from an external personal computer or the like through the network I/F section 204, and facsimile data received from an external facsimile machine 80 through the facsimile communication section 203. The image forming section 9 performs image forming operation in accordance with an image indicated by print data, or print data including an image indicated by the print data and combined with electronic watermark information by the electronic watermark information combining section 211.

The memory 201 serves as a buffer for temporarily storing print data received through the facsimile communication section 203, the network I/F section 204, the parallel I/F section 205, or the serial I/F section 206. Further, the memory 201 serves as an operation area at the time when an operation control is performed by the control unit 21.

The operating section 7 corresponds to the operating section 7 shown in FIG. 1. The operating section 7 is used for allowing a user to perform operations associated with a copying function, a printer function, a facsimile function, a scanner function, and the like and gives an operation command or the like inputted by the user to the control unit 21. Further, the operating section 7 receives an input of a password, which will be described later, from a user. The operating section 7 includes a display section 73 having a touch panel and the like and an operation key portion having the aforementioned start key 71, the numerical keys 72, and the like. The operation key portion is used for input of various instructions such as a copying start instruction or a facsimile transmission start instruction by a user or input of a password by the user.

The facsimile communication section 203 includes an encoding/decoding section (unillustrated), a modulating/demodulating section (unillustrated), and an NCU (Network Control Unit: unillustrated) and is adapted to transmit print data of a document read by the document reading section 5 to another facsimile machine 80 through a phone line (public line 81) or an internet line and receive print data transmitted from another facsimile machine 80. The encoding/decoding section is adapted to compress/encode print data to be transmitted and expand/decode received print data, and the modulating/demodulating section is adapted to modulate compressed/decoded print data into an audio signal and demodulate received signal (audio signal) into print data. Further, the NCU controls connection through a phone line with the facsimile machine 80 as an addressee.

The network I/F section 204 uses a network interface (for example, 10/100base-TX) or the like to control transmission of various data between user-side terminals connected through a network. Further, in a case where the computer 3 and the like are connected to the network, the network I/F section 204 controls transmission of various data with respect to the computer 3. For example, the network I/F section 204 receives print data transmitted from the computer 3 for printing in the image forming section 9 and transmits print data of a document read by the document reading section 5 to a terminal device. The network I/F section 204, under an instruction by the communication section 213, receives a user ID (identification information in claims) from the computer 3 and transmits a password generated by the password generating section 212 to the computer 3.

The parallel I/F section 205 receives print data and the like from an external equipment and the like with use of a high-speed bi-directional parallel interface (for example, IEEE1284 compatible) or the like in a parallel transfer of transmitting data in units of a plurality of bits through a plurality of signal lines. The parallel I/F section 205, in a case where the computer 3 is connected to the parallel interface, receives a user ID from the computer 3 and transmits a password generated by the password generating section 212 to the computer 3, under an instruction given by the communication section 213.

The serial I/F section 206 receives various data and the like from an external equipment and the like with use of a serial interface (for example, RS-232C) or the like in a serial transfer of transmitting data sequentially one bit after another through a single signal line. The serial I/F section 206, in a case where the computer 3 is connected to the serial interface, receives a user ID from the computer 3 and transmits a password generated by the password generating section 212 to the computer 3, under an instruction given by the communication section 213.

The HDD 207 stores print data read by the document reading section 5, print data transmitted through the network, and the like. The print data stored in the HDD 207 is not only used in the complex machine 2 but also confirmed by a terminal device such as the computer 3 through the network I/F section 204 and transferred to a predetermined folder of the terminal device, for use in the terminal device.

The memory 201 or the HDD 207 stores a user ID (identification information) for permission to output image data which is not combined with the electronic watermark information. The memory 201 or the HDD 207 is an example of an identification information storage section in claims. Hereinafter, the HDD 207 will be described as an example of the identification information storage section.

The control unit 21 includes, in an unillustrated CPU (Central Processing Unit), a ROM (Read Only Memory) which stores a basic program defining an operation of the CPU and an internal memory (unillustrated) such as a RAM or the like which temporarily stores data. The control unit 21 includes a controller 210, an electronic watermark information combining section 211, and a password generating section 212. The CPU is operated in accordance with an image forming operation program which will be described later, so that the control unit 21 serves as the controller 210, the electronic watermark information combining section 211, and the password generating section 212.

However, the controller 210, the electronic watermark information combining section 211, and the password generating section 212 may be configured by individual circuits, and a unit including the controller 210, the electronic watermark information combining section 211, and the password generating section 212 may be configured as the control unit 21.

The controller 210 entirely controls the complex machine 2 in accordance with operation command or the like received at the operating section 7 or the like. More particularly, the controller 210 serves as a scanner controller which controls operations of respective parts used for realizing the scanner function, a facsimile controller which controls operations of respective parts used for realizing the facsimile function, a printer controller which controls operations of respective parts used for realizing the printer function, and a copy controller which controls operations of respective parts used for realizing the copying function.

The electronic watermark information combining section 211 combines electronic watermark information, which will be described later, with print data. The password generating section 212 determines whether or not the user ID transmitted from the computer 3 matches with the user ID stored in the HDD 207 (a user ID which is given to a user and stored in the HDD for permission of print-out (output) of image data which is not combined with the electronic watermark information). In a case where the user ID are matching, the password generating section 21 generates a password consisting of alphanumerical characters different from the user ID or arrangement of signs. The communication section 213 (password transmitting section, identification information receiving section) performs communication control associated with transmission of a password generated by the password generating section 212 and reception of the user ID with respect to the computer 3.

An example of a processing for combining the electronic watermark information performed by the electronic watermark information combining section 211 will be described with reference to FIG. 4. (1) The electronic watermark information is embedded as a latent image into an image formed on a document. For example, the electronic watermark information combining section 211 uses dither patterns of different kinds respectively for a latent image portion which includes electronic watermark information and a background portion other than the latent image portion. One pattern intensity is set to be higher than the resolution for document reading performed by the document reading section 25, and the other pattern intensity is set to be equal to or lower than the resolution for document reading performed by the document reading section 25, and image forming is performed by the image forming section 9 with the aforementioned pattern intensities. At this time, if a person takes a look at the original document created by the image forming (a document with an image into which the electronic watermark information is embedded), it is difficult to visually recognize the electronic watermark information. However, when the image on the document is optically read by the document reading section 25, the difference between the resolution at the time of image forming performed by the image forming section 9 and the resolution at the time of document reading performed by the document reading section 25 causes a pattern formed by the electronic watermark information appears on the read document or the image formed by printing out the read image. Accordingly, in the case where the document into which the electronic watermark information is embedded is copied with the complex machine 2, a pattern formed by the electronic watermark information (in FIG. 4) can appear on the sheet on which the copy is formed, or relevant information may be embedded as electronic watermark information in print data. The data necessary for combining of the electronic watermark information is stored in advance in the electronic watermark information combining section 211.

Further, (2) the electronic watermark information combining section 211, when print data consisting of a confidential document or the like is outputted to a sheet, may form a predetermined special dot pattern (which is stored in advance in the electronic watermark information combining section 211) onto a background image of the image of the print data and embed the special dot pattern as the electronic watermark information. In other words, the special dot pattern may be set as the electronic watermark information. Then, when an original document (a document with an image into which the electronic watermark information is embedded) is optically read by the document reading section 25, the controller 210 determines whether or not the predetermined special dot pattern is present in the read image. In a case where the special dot pattern is detected, the controller 210 performs a control of prohibiting copying (image forming) of the document (so-called copy guard technology).

In principle, the aforementioned controller 210, when an image indicated by the print data is printed out, controls the image forming section 9 to output image data in which the electronic watermark information is combined by the electronic watermark information combining section 211. However, in a case where the password received at the operating section 7 from a user matches with the password transmitted from the communication section 213 to the computer 3, the controller 210 controls the image forming section 9 to output image data in which the electronic watermark information is not combined.

Although it is not especially illustrated, the control unit 21 includes an image processing section which performs various image processing with respect to print data, for example, general image processing necessary for image forming in the image forming section 9, such as predetermined correction processing including level correction and γ-correction with respect to print data obtained by the reading operation performed by the document reading section 5 and various processing necessary for image forming including compression or expansion processing, enlargement or reduction processing, and the like.

The image forming operation program which defines operation of the CPU to realize the functions of respective parts of the control unit 21 is, for example, accommodated in a nonvolatile and large-capacity external storage device such as the HDD 207 and suitably transferred to a main storage device such as the RAM, for execution by the CPU. The image forming operation program can be supplied to the complex machine 2 through a recording medium such as a ROM or CD-ROM, or through a transmission medium such as a network connected to the network I/F section 204. The transmission medium is not limited to a wired transmission medium but may be a wireless transmission medium. Further, the transmission medium includes not only a communication line but also a relay device for relaying the communication line, for example, a communication link such as a router.

In a case where the program is supplied through a ROM, a ROM storing the program is installed to the control unit 21, for execution by the CPU. In a case where the program is supplied through a CD-ROM, a CD-ROM reading device is connected to, for example, the parallel I/F section 205, and the program is transferred to the RAM or the HDD 207, for execution by the CPU. Further, in a case where the program is supplied through a transmission medium, the program received through the network I/F section 204 is transferred to the RAM or HDD 207, for execution by the CPU.

Figure 5:
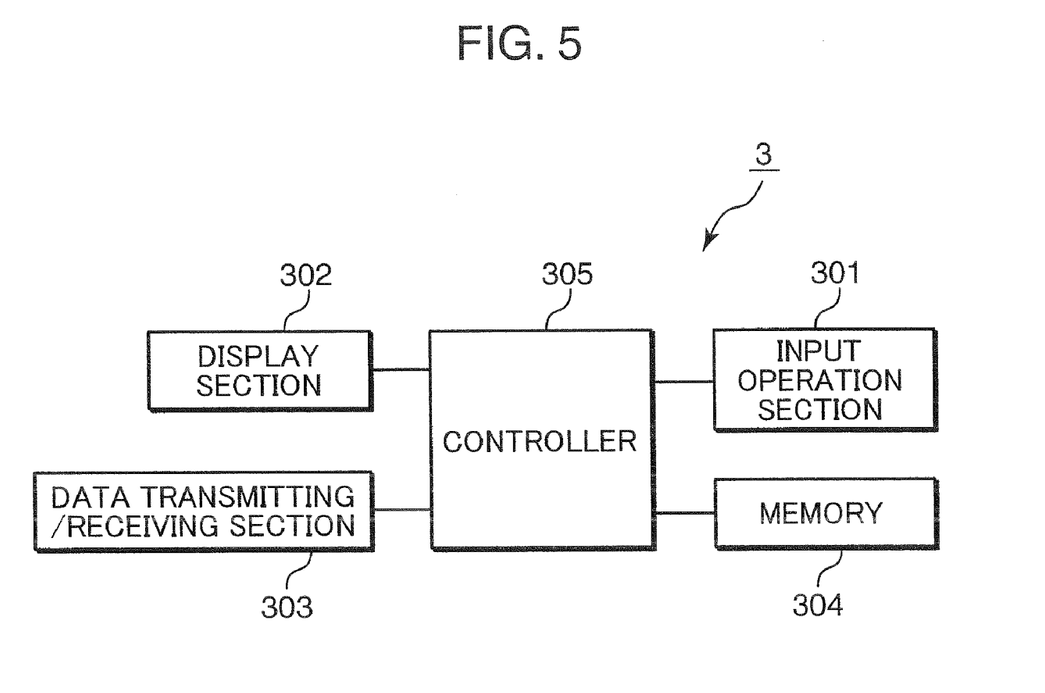
FIG. 5 schematically shows a configuration of a computer.

FIG. 5 shows a schematic configuration of the computer 3. As shown in FIGS. 1 and 5, the computer 3 includes an input operation section 301 having a keyboard and a mouse, a display section 302 such as a liquid crystal display for displaying various screens, the data transmitting/receiving section 303 for communication with the complex machine 2, a memory 304, and a controller 305.

The input operation section 301 (output instruction receiving section, identification information receiving section) receives an input of an image output instruction (print-out instruction) with respect to the complex machine 2 from a user, and also receives the user's unique user ID from the user.

The display section 302 displays a password received by the data transmitting/receiving section 303 from the complex machine 2.

The data transmitting/receiving section 303 transmits an image output instruction and a user ID received by the input operation section 301 to the complex machine 2. Further, the data transmitting/receiving section 303 receives the password replied from the complex machine 2 in response to the user ID transmitted to the complex machine 2.

The memory 304 stores various data including print data which should be transmitted to the complex machine 2.

The controller 305 is configured by a memory including a ROM for storing a control program and the like and a RAM for temporarily storing data, and a CPU which reads the control program and the like from the ROM and executes the same.

The above-described user ID and the password are different from one another.

Figure 6:
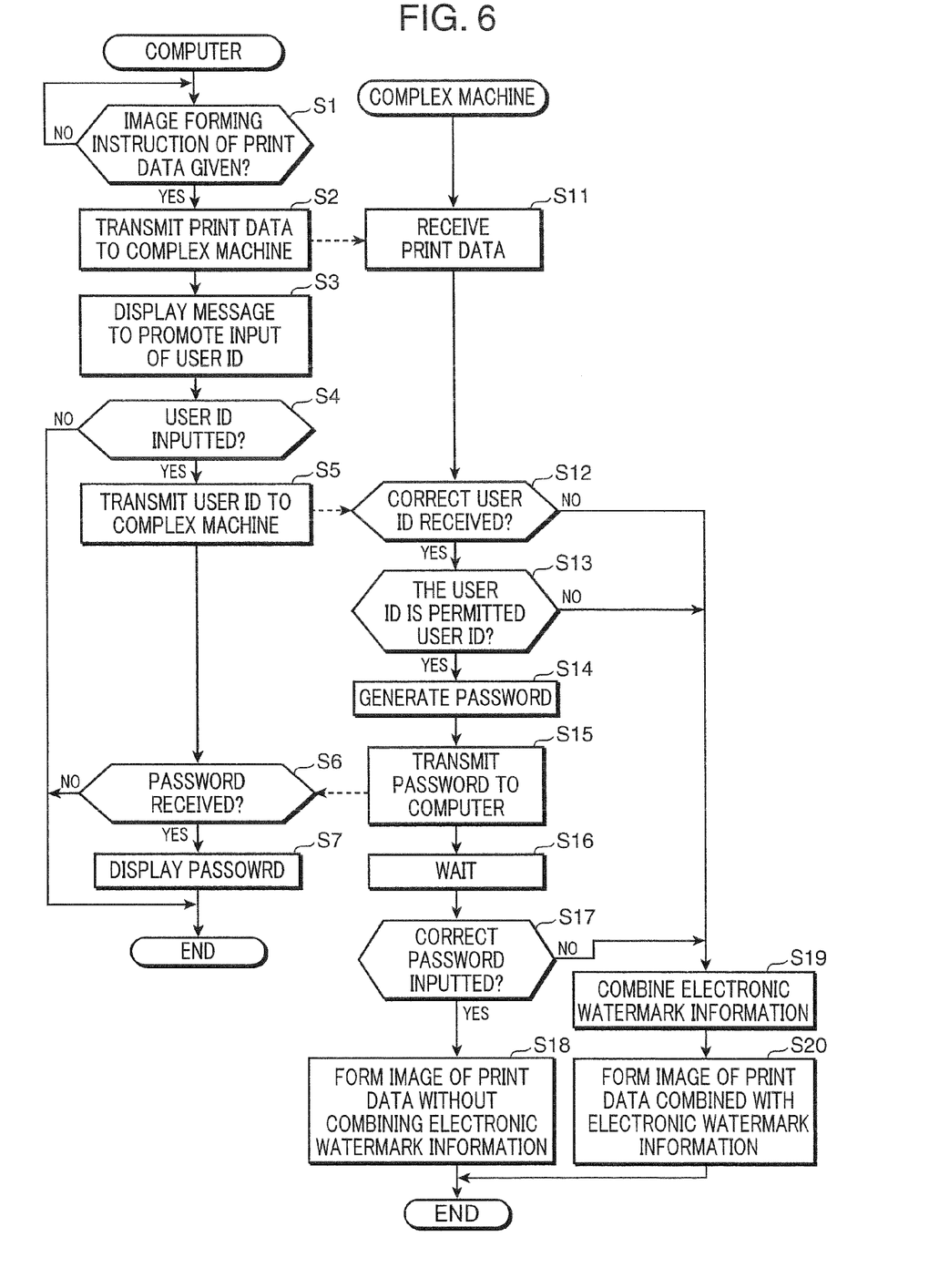
FIG. 6 is a flowchart showing a processing executed by the image output system at the time when image forming is performed.

Next, the processing which is executed by the image output system 1 at the time when the image forming is performed will be described. FIG. 6 is a flowchart showing a processing executed by the image output system 1 at the time when the image forming is performed.

In the computer 3, when a user operates the input operation section 301, the input operation section 301 receives an input of an image forming instruction designating the complex machine 2 as a printer for printing (an instruction for printing in the complex machine 2) in connection with desired print data from the user (YES in S1), the controller 305 controls the data transmitting/receiving section 303 to transmit the print data to the complex machine 2 (S2). Then, the controller 305 controls the display section 302 to display a message for promoting a user to input a user ID (S3). On the other hand, in the complex machine 2, the communication section 213 receives the print data from the computer 3 through, for example, the network I/F section 204 (S1).

Herein, the user ID is user's unique identification information given in advance to each user and is used in the complex machine 2 to determine whether or not a user is allowed to print an image indicated by the print data without combining the electronic watermark information, or to determine whether or not the user is allowed to print the image indicated by the print data.

When a user operates the input operation section 301, and the input operation section 301 receives an input of the user ID from the user (YES in S4), the controller 305 controls the data transmitting/receiving section 303 to transmit the inputted user ID to the complex machine 2 (S5). Further, after the display section 302 displays the message to promote the input of the user ID, when the input operation section 301 does not receive the input of the user ID after an elapse of a predetermined time (NO in S4), the processing is terminated.

In the complex machine 2, for example, if the communication section 213 receives the user ID from the computer 3 through the network I/F section 204 (YES in S12), the password generating section 212 determines whether or not the user ID received from the computer 3 matches with the user ID which is stored in the HDD 207 as the user ID for a user who is allowed to print an image without combining with the electronic watermark information (S13). In other words, at least one user ID for permission of printing image data without being combined with the electronic watermark information is stored in advance in the HDD 207.

In a case where the user ID received from the computer 3 matches with the user ID for permission to print image data without being combined with the electronic watermark information (YES in S13), the password generating section 212 generates a password consisting of alphanumerical characters or signs different from the user ID (S14).

Figure 7A:
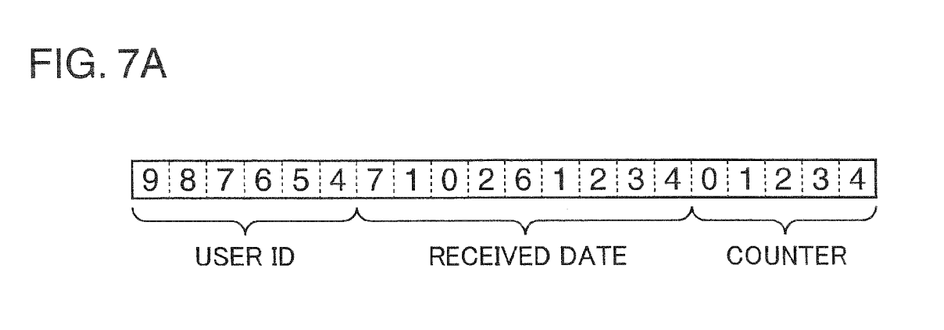
FIGS. 7A and 7B show a first example of a password generating processing.
Figure 7B:
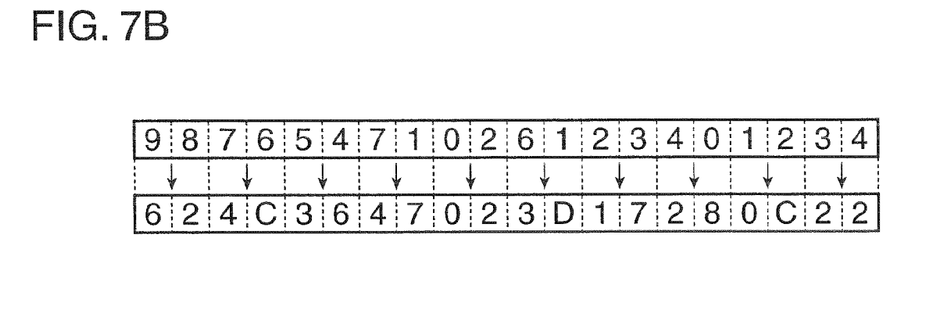

Herein, the password generating section 212 randomly generates the password as a one-time password which can be used for only one time. For example, as a first example of generating a password, as shown in FIG. 7A, if a user ID for permission of printing image data without being combined with the electronic watermark information is "987654," and the date and time of reception of the user ID by the communication section 213 is "2007.10.26, 12:34," and the value of an image forming sheet counter (unillustrated) indicates "01234" indicating 1234 sheets at the date and time of reception of the user ID, the password generating section 212 connects the sequence of numbers to firstly create "98765471026123401234" (as the sequence of numbers indicating the date and time of reception of the user ID, a sequence in which only one last digit of the year and five digits of the value of an image forming sheet counter are combined is used). Further, as shown in FIG. 7B, it is presumed that the created sequence of numbers includes two-digit decimal numbers from the left side, and the sequence "624C3647023D17280C22" is created by converting the sequence of decimal numbers into hexadecimal numbers (HEX conversion). As a result, the sequence "624C3647023D17280C22" is set to be the password.

Figure 8:
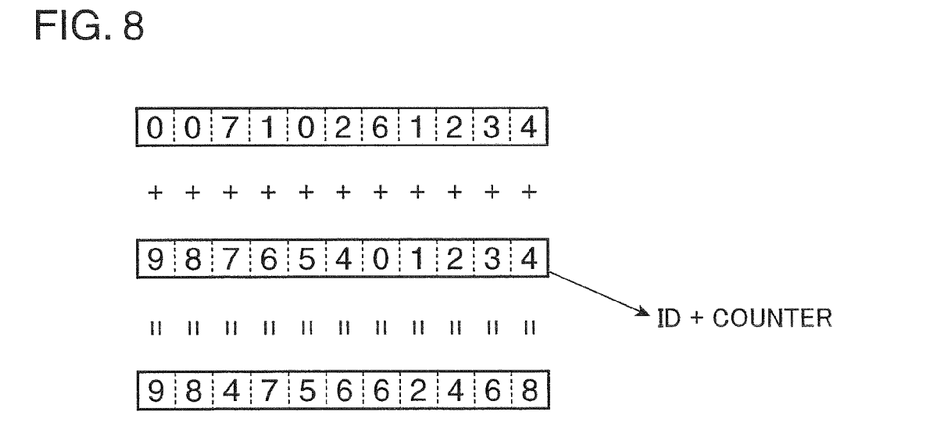
FIG. 8 shows a second example of a password generating processing.

Further, the password generating section 212 may generate the password in a manner as shown in FIG. 8. For example, as a second example of generating a password, the password generating section 212 combines the date and time of reception of the user ID "2007.10.26" with the value "01234" of the image forming sheet counter to create the sequence of "00710261234." (Herein, only the last three digits of the year of the date and time of reception of the user ID are used, and only the last four digits of the value of the image forming sheet counter are used.) Next, the password generating section 212 combines "987654" as the user ID with "01234" of the value of the image forming sheet counter to create the sequence "98765401234." (Herein, all of five digits of the image forming sheet counter is used.) then, the password generating section 212 adds the sequences "00710261234" with "98765401234" disregarding carry of addition to create the sequence "98475662468." As a result, the sequence "98475662468" is set to be the password. In the case of the second example, the number of digits of the password can be made smaller than that of the first example.

Other than the above-mentioned examples, the password generating section 212 may use encoding technologies such as the DES (Data Encryption Standard) and the AES (Advanced Encryption Standard) to perform encoding while presuming, for example, the user ID as plain text data, and the date and time of reception of the user ID and the value of image forming sheet counter as key data, so that a password whose meaning cannot be recognized by taking at a glance can be generated.

The password generated in the manner as described above is transmitted by the communication section 213 to the computer 3 through the network I/F section 204 (S15). After that, the controller 210 performs a control of allowing an operation of printing the print data with the complex machine 2 to fall in a waiting state (S16).

In the computer 3, when the password is received by the data transmitting/receiving section 303 (YES in S6), the controller 305 controls the display section 302 to display the password (S7).

After visually confirming the password displayed on the display section 302, a user moves to a position where the complex machine 2 is located which is designated as a destination of printing. Then, the user operates the operating section 7 of the complex machine 2 to input the password.

In the complex machine 2, when the operating section 7 receives the input of the password from the user, the controller 210 determines whether the received password matches with the password transmitted to the computer 3 by the communication section 213 in S15 (S17). In a case where the received password matches with the password transmitted to the computer 3 (YES in S17), the electronic watermark information combining section 211 does not combine the electronic watermark information to the image indicated by the print data received in S11, and the controller 210 controls the image forming section 9 to perform image forming operation of image data which is not combined with the electronic watermark information (S18).

Further, in S12, in a case where the communication section 213 does not receive the user ID from the computer 3 (NO in S12), or in a case where the user ID received by the communication section 213 does not match with the user ID stored in the HDD 207 (NO in S13), or in the case where the operating section 7 does not receive the input of the password, or in the case where the password inputted to the operating section 7 does not match with the password transmitted to the computer 3 (NO in S17), the electronic watermark information combining section 211 basically combines the electronic watermark information to the image indicated by the print data in accordance with setting (S19), and the controller 210 controls the image forming section 9 to perform image forming operation of the image data combined with the electronic watermark information (S20).

Accordingly, at the time when a printing operation is performed by the complex machine 2, it is possible to switch whether the electronic watermark information is to be embedded. Further, since printing of image data which is not combined with the electronic watermark information is performed when a proper user ID is inputted to the computer 3 or the complex machine 2 and also a password which is different from the user ID (preferably a one-time password) is inputted to the complex machine, it can prevent a third person having a bad intention from easily performing unfair printing of an image indicated by print data without combining of the electronic watermark information.

The present invention is not limited to the configuration of the embodiment, and various modifications can be made. In the embodiment, image forming of image data which is combined with the electronic watermark information is performed (S19, S20) in the case where the communication section 213 does not receive a correct user ID (NO in S12) and in the case where the operating section 7 does not receive a correct password (NO in S17). (a) In these cases, the controller 210 may perform a control of prohibiting image forming operation of an image indicated by print data and instructed by a user to be formed. (b) Further, in the case where the communication section 213 does not receive a correct user ID from the computer 3 (NO in S12), the controller 210 may prohibit image forming operation of an image indicated by print data and instructed by a user to be formed, and in the case where a correct password is not inputted to the operating section 7 (NO in S17), the controller 210 performs a control of forming an image of the image data combined with the electronic watermark information. (c) Alternatively, in the case where the communication section 213 does not receive a correct user ID from the computer 3 (NO in S12), the controller 210 may perform a control of forming an image of the image data combined with the electronic watermark information, and in the case where a correct password is not inputted to the operating section 7 (NO in S17), the controller 210 may perform a control of prohibit image forming operation of an image indicated by print data whose image is instructed to be formed.

Further, the password generating operation performed by the password generating section 212 is not limited to the examples described above, and various method for generating the password can be adopted.

In summary, an image output system according to an aspect of the present invention includes: a computer; and an image forming apparatus connected to the computer, wherein the computer includes: an output instruction receiving section which receives from a user an input of an image output instruction with respect to the image forming apparatus; an identification information receiving section which receives from a user an input of the user's unique identification information of the user; a transmitting section which transmits the image output instruction and the identification information respectively received by the output instruction receiving section and the identification information receiving section to the image forming apparatus; a receiving section which receives a password replied from the image forming apparatus in response to the identification information transmitted from the transmitting section to the image forming apparatus; and a display section which displays the password received by the receiving section, and the image forming apparatus includes: an electronic watermark information combining section which combines electronic watermark information with image data to be outputted; an output section which outputs image data to be outputted or image data which has been combined with the electronic watermark information by the electronic watermark information combining section; an identification information storage section which stores identification information for permission to output image data which is not combined with the electronic watermark information; an identification information receiving section which receives identification information transmitted from the transmitting section of the computer; a password generating section which generates a password different from the identification information if the identification information received by the identification information receiving section is stored in the identification information storage section; a password transmitting section which transmits the password generated by the password generating section to the computer; a password receiving section which receives input of a password from a user; and a controller which controls the output section to output image data which is not combined with the electronic watermark information by the electronic watermark information combining section in a case where the password received by the password receiving section matches with the password transmitted from the password transmitting section to the computer.

Further, an image forming apparatus according to an aspect of the present invention includes: an electronic watermark information combining section which combines electronic watermark information with image data to be outputted; an output section which outputs image data to be outputted or image data which has been combined with the electronic watermark information by the electronic watermark information combining section; an identification information storage section which stores identification information for permission to output image data which is not combined with the electronic watermark information; a password generating section which generates a password different from the identification information if the identification information transmitted from a connected computer is stored in the identification information storage section; a password transmitting section which transmits the password generated by the password generating section to the computer; a password receiving section which receives input of a password from a user; and a controller which controls the output section to output image data which is not combined with the electronic watermark information by the electronic watermark information combining section in a case where the password received by the password receiving section matches with the password transmitted from the password transmitting section to the computer.

Further, a computer-readable recording medium according to an aspect of the present invention stores an image forming operation program which controls a control device provided in an image forming apparatus to allow the control device and the image forming apparatus to serve as: an electronic watermark information combining section which combines electronic watermark information with image data to be outputted; an output section which outputs image data to be outputted or image data which has been combined with the electronic watermark information by the electronic watermark information combining section; an identification information storage section which stores identification information for permission to output image data which is not combined with the electronic watermark information; a password generating section which generates a password different from the identification information if the identification information transmitted from a connected computer is stored in the identification information storage section; a password transmitting section which transmits the password generated by the password generating section to the computer; a password receiving section which receives input of a password from a user; and a controller which controls the output section to output image data which is not combined with the electronic watermark information by the electronic watermark information combining section in a case where the password received by the password receiving section matches with the password transmitted from the password transmitting section to the computer.

According to the invention, if the identification information transmitted from the computer is stored in the identification information storage section, the password generating section of the image forming apparatus generates a password which is different from the identification information, and the password transmitting section transmits the generated password to the computer. In a case where the password received at the password receiving section from a user matches with the transmitted password, the controller controls the output section to output image data which is not combined with the electronic watermark information. Accordingly, (1) switching of embedding or not embedding the electronic watermark information can be switched, and (2) output of image data which is not combined with the electronic watermark information is permitted when the proper identification information is inputted from the computer to the image forming apparatus and a password which is different from the identification information is further inputted, so that it can prevent unfair output without the electronic watermark information from being easily performed. In other words, according to the present invention, easiness in switching of embedding or not embedding the electronic watermark information and prevention of unfair output without the electronic watermark information can be achieved concurrently.

In a conventional technology of embedding electronic watermark information, if it is made possible to switch ON/OFF in embedding the electronic watermark information as needed on a user level, a person having a bad intention can easily perform unfair output (the person can print out image data without embedding of the electronic watermark information). Therefore, in order to prevent leakage of information, regardless of a user who outputs image data and contents of image data to be outputted, it is necessary to forcibly embed the electronic watermark information to image data to be outputted. Accordingly, since embedding the electronic watermark information to all of image data to be outputted causes embedding of information to image data to which the information is not necessary to be embedded (not confidential document), it may cause unnecessary increase in the amount of consumed toner and deterioration in image quality of image data and the like. However, according to the present invention, unfair output of image data to be outputted output can be safely secured while enabling switching of embedding or not embedding the electronic watermark information can be performed on the user level as needed and preventing disadvantages of unnecessary increase in the amount of consumed toner and unnecessary deterioration in image quality of image data and the like.

Further, according to an aspect of the present invention, the controller controls the output section to output image data combined with the electronic watermark information by the electronic watermark information combining section in a case where the password received by the password receiving section does not match with the password transmitted from the password transmitting section to the computer.

According to this invention, even if the password received by the password receiving section does not match with the password transmitted from the password transmitting section to the computer, the output of image data transmitted from the computer is not completely prohibited, thus convenience in printing is secured while maintaining suppressing of unfair output.

Further, according to an aspect of the present invention, the controller prohibits the output section from outputting image data in a case where the password received by the password receiving section does not match with the password transmitted from the password transmitting section to the computer.

According to this invention, if the password received by the password receiving section does not match with the password transmitted from the password transmitting section to the computer, output of image data transmitted from the computer is prohibited, thus unfair output can be prevented more reliably.

Further, according to an aspect of the present invention, the password generating section does not generate a password, and the controller prohibits the output section from outputting image data, in a case where the identification information transmitted from the transmitting section of the computer is not stored in the identification information storage section, and the controller controls the output section to output image data combined with the electronic watermark information by the electronic watermark information combining section in a case where the password received by the password receiving section does not match with the password transmitted from the password transmitting section to the computer.

According to this invention, in accordance with the degree of possibility that the output is unfair, prohibiting output of image data is prohibited, or output by combining image data with the electronic watermark information can be selectively performed. Accordingly, a method for preventing unfair output without combining of the electronic watermark information can be provided properly in accordance with the degree of possibility that the output is unfair can be provided.

Further, according to an aspect of the present invention, the password generating section of the image forming apparatus generates the password randomly.

According to this invention, since the password is randomly generated by the password generating section of the image forming apparatus, even if a person having a bad intention finds out the identification information, the person cannot predict the password from the identification information to use the password many times. Therefore, a damage in the case where the person having bad intention finds out the identification information can be reduced.

Further, according to an aspect of the present invention, the password generating section of the image forming apparatus generates the password as one-time password which can be used for only one time.

According to this invention, since the password generating section of the image forming apparatus generates the password as one-time password which can be used for only one time, even if a person having a bad intention finds out the identification information, the person cannot predict the password from the identification information to use the password many times. Therefore, a damage in the case where the person having bad intention finds out the identification information can be reduced.

Further, according to an aspect of the present invention, the password generating section of the image forming apparatus generates a sequence by performing calculation in accordance with identification information transmitted from the transmitting section of the computer, date-and-time information associated with date and time at which the output instruction is received, and information associated with the number of sheets to be outputted by the output section, and further encoding the sequence.

According to this invention, in accordance with a timing at which the identification information is transmitted from the transmitting section of the computer, the password transmitting section can generate a different password for a respecting timing at which the identification information is received.

This application is based on Japanese Patent application serial No. 2008-037110 filed in Japan Patent Office on Feb. 19, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image output system comprising:
    a computer; and
    an image forming apparatus connected to the computer, wherein
    the computer includes:
        an output instruction receiving section which receives from a user an input of an image output instruction with respect to the image forming apparatus;
        an identification information receiving section which receives from a user an input of the user's unique identification information of the user;
        a transmitting section which transmits the image output instruction and the identification information respectively received by the output instruction receiving section and the identification information receiving section to the image forming apparatus;
        a receiving section which receives a password replied from the image forming apparatus in response to the identification information transmitted from the transmitting section to the image forming apparatus; and
        a display section which displays the password received by the receiving section, and
    the image forming apparatus includes:
        an electronic watermark information combining section which combines electronic watermark information with image data to be outputted;
        an output section which outputs image data to be outputted or image data which has been combined with the electronic watermark information by the electronic watermark information combining section;
        an identification information storage section which stores identification information for permission to output image data which is not combined with the electronic watermark information;
        an identification information receiving section which receives identification information transmitted from the transmitting section of the computer;
        a password generating section which generates a password different from the identification information if the identification information received by the identification information receiving section is stored in the identification information storage section;
        a password transmitting section which transmits the password generated by the password generating section to the computer;
        a password receiving section which receives input of a password from a user; and
        a controller which controls the output section to output image data which is not combined with the electronic watermark information by the electronic watermark information combining section in a case where the password received by the password receiving section matches with the password transmitted from the password transmitting section to the computer.

2. The image output system according to claim 1, wherein the controller controls the output section to output image data combined with the electronic watermark information by the electronic watermark information combining section in a case where the password received by the password receiving section does not match with the password transmitted from the password transmitting section to the computer.

3. The image output system according to claim 1, wherein the controller prohibits the output section from outputting image data in a case where the password received by the password receiving section does not match with the password transmitted from the password transmitting section to the computer.

4. The image output system according to claim 1, wherein
    the password generating section does not generate a password, and the controller prohibits the output section from outputting image data, in a case where the identification information transmitted from the transmitting section of the computer is not stored in the identification information storage section, and
    the controller controls the output section to output image data combined with the electronic watermark information by the electronic watermark information combining section in a case where the password received by the password receiving section does not match with the password transmitted from the password transmitting section to the computer.

5. The image output system according to claim 1, wherein the password generating section of the image forming apparatus generates the password randomly.

6. The image output system according to claim 1, wherein the password generating section of the image forming apparatus generates the password as one-time password which can be used for only one time.

7. The image output system according to claim 1, wherein the password generating section of the image forming apparatus generates a sequence by performing calculation in accordance with identification information transmitted from the transmitting section of the computer, date-and-time information associated with date and time at which the output instruction is received, and information associated with the number of sheets to be outputted by the output section, and further encoding the sequence.

8. An image forming apparatus comprising:
    an electronic watermark information combining section which combines electronic watermark information with image data to be outputted;
    an output section which outputs image data to be outputted or image data which has been combined with the electronic watermark information by the electronic watermark information combining section;
    an identification information storage section which stores identification information for permission to output image data which is not combined with the electronic watermark information;
    a password generating section which generates a password different from the identification information if the identification information transmitted from a connected computer is stored in the identification information storage section;
    a password transmitting section which transmits the password generated by the password generating section to the computer;
    a password receiving section which receives input of a password from a user; and
    a controller which controls the output section to output image data which is not combined with the electronic watermark information by the electronic watermark information combining section in a case where the password received by the password receiving section matches with the password transmitted from the password transmitting section to the computer.

9. A non-transitory computer-readable recording medium storing an image forming operation program which controls a control device provided in an image forming apparatus to allow the control device and the image forming apparatus to serve as: an electronic watermark information combining section which combines electronic watermark information with image data to be outputted; an output section which outputs image data to be outputted or image data which has been combined with the electronic watermark information by the electronic watermark information combining section; an identification information storage section which stores identification information for permission to output image data which is not combined with the electronic watermark information; a password generating section which generates a password different from the identification information if the identification information transmitted from a connected computer is stored in the identification information storage section; a password transmitting section which transmits the password generated by the password generating section to the computer; a password receiving section which receives input of a password from a user; and a controller which controls the output section to output image data which is not combined with the electronic watermark information by the electronic watermark information combining section in a case where the password received by the password receiving section matches with the password transmitted from the password transmitting section to the computer.

* * * * *